(No Model.) 2 Sheets—Sheet 2.
J. W. TAYLOR.
SLED.

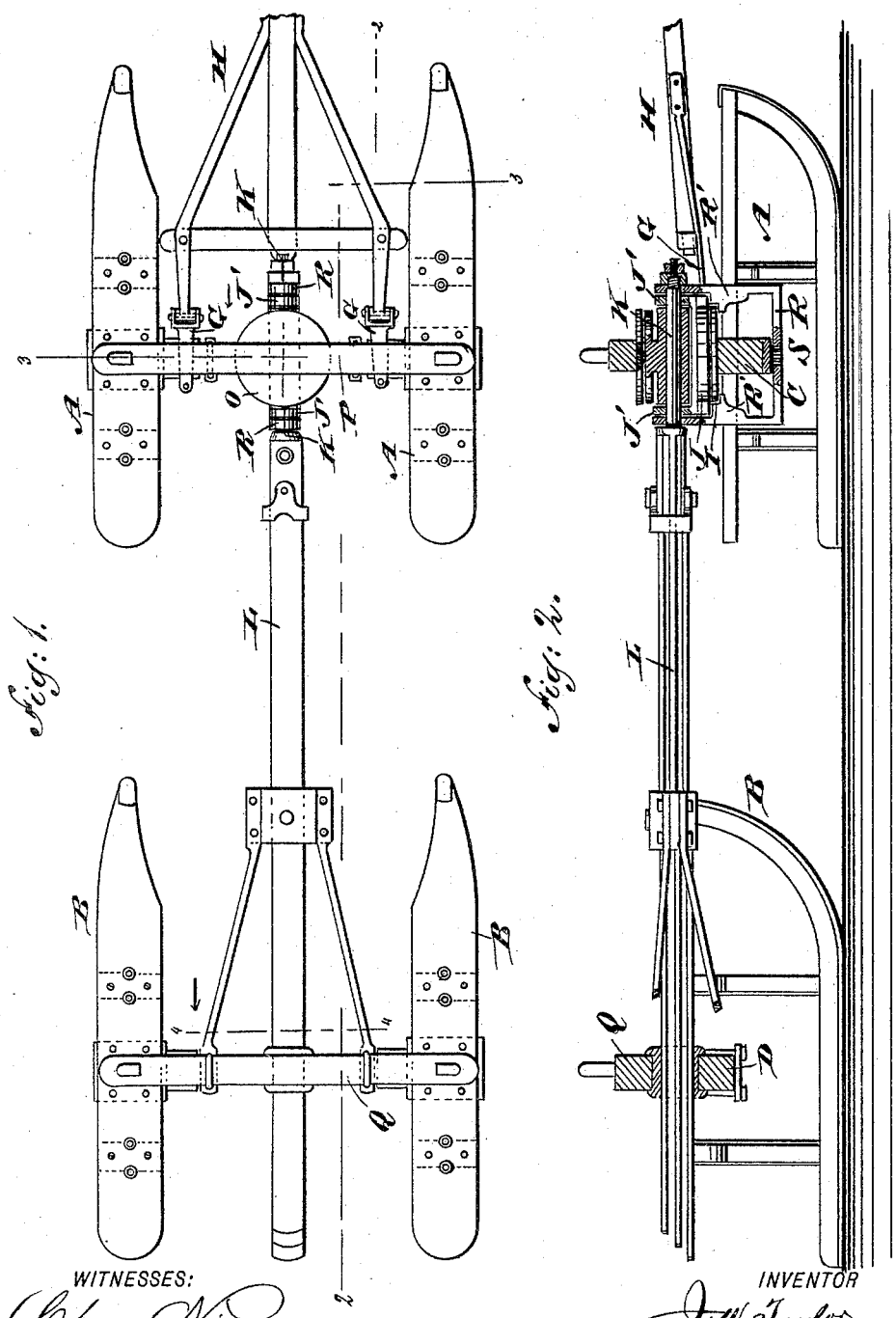

No. 497,143. Patented May 9, 1893.

WITNESSES:
Chas. Nida.
C. Sedgwick.

INVENTOR
J. W. Taylor
BY
Munn & Co.
ATTORNEYS.

UNITED STATES PATENT OFFICE.

JAMES W. TAYLOR, OF VERMILLION, SOUTH DAKOTA.

SLED.

SPECIFICATION forming part of Letters Patent No. 497,143, dated May 9, 1893.

Application filed July 11, 1892. Serial No. 439,564. (No model.)

*To all whom it may concern:*

Be it known that I, JAMES W. TAYLOR, of Vermillion, in the county of Clay and State of South Dakota, have invented a new and Improved Sled, of which the following is a full, clear, and exact description.

The invention relates to vehicles mounted on runners, and its object is to provide a new and improved bob-sled, which is simple and durable in construction, and arranged to permit the runners to readily pass over uneven surfaces in the road without disturbing the position of the box.

The invention consists of certain parts and details, and combinations of the same, as will be hereinafter described and then pointed out in the claims.

Reference is to be had to the accompanying drawings forming a part of this specification, in which similar letters of reference indicate corresponding parts in all the figures.

Figure 3:
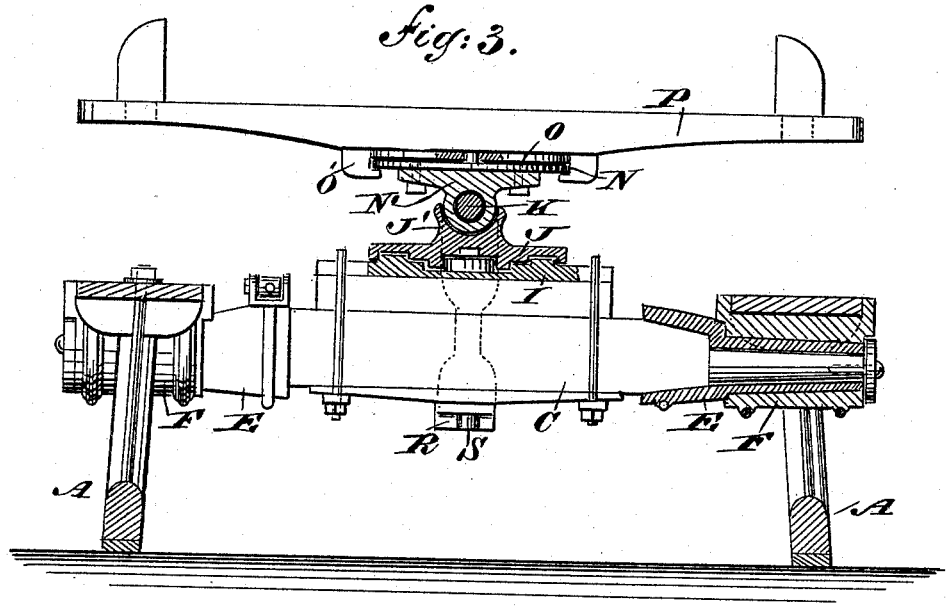
Figure 4:
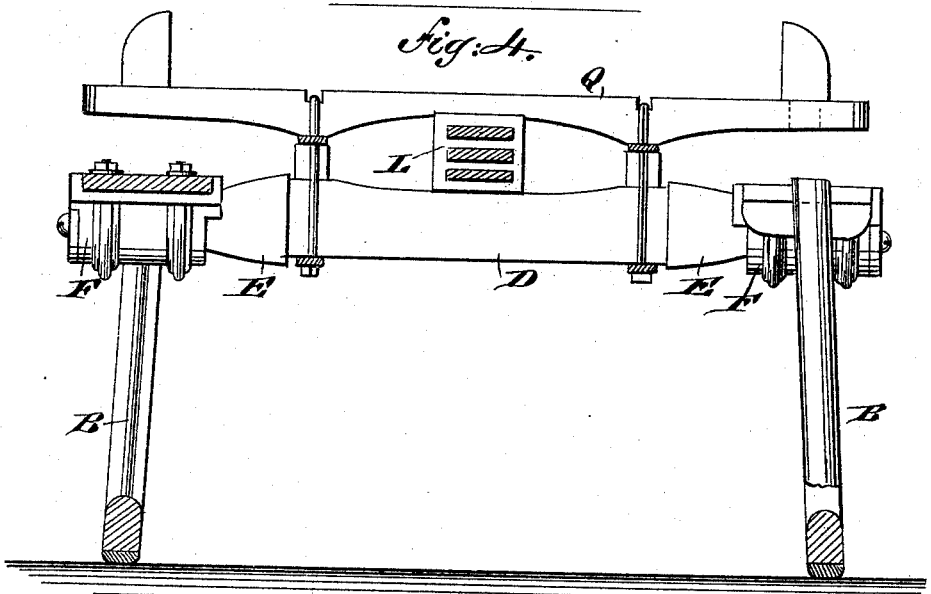
Figure 5:
Figure 6:
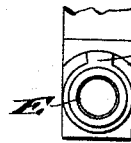

Figure 1 is a plan view of the improvement. Fig. 2 is a sectional side elevation of the same on the line 2—2 of Fig. 1. Fig. 3 is an enlarged transverse section of the same on the line 3—3 of Fig. 1. Fig. 4 is a similar view of the same on the line 4—4 of Fig. 1. Fig. 5 is an enlarged side elevation of the bearing for the runner; and Fig. 6 is a similar view of the thimble.

The improved sled is provided with a pair of front runners A, and a pair of rear runners B, mounted to turn on the front and rear axles C and D respectively. Each of the axles C and D is provided on its ends with thimbles E, on which turn the bearings F, of the runners, the said thimble being provided with an upwardly-extending lug E', engaging a recess F', formed in the bearing F, as will be readily understood by reference to Figs. 5 and 6, the lug E' being somewhat smaller than the recess F' so that a sufficient amount of swing is permitted to the runner before the lug E' strikes the ends of the recess F'. By this arrangement, the swinging movement of each runner is limited.

On the heads of the thimbles E for the front axle C are secured clips G, supporting the tongue or pole H, of the vehicle. See Figs. 1 and 2. On the top of the front axle C and at the middle of the same is clipped a disk I, engaged on its top by a fifth wheel J, similar in construction to the one shown and described in Letters Patent, No. 472,824, for a fifth wheel for vehicles, granted to me on April 12, 1892, so that further description thereof is not deemed necessary.

On the top of the fifth wheel J are formed lugs J', arranged opposite each other in the longitudinal axis of the vehicle, the said lugs forming a bearing for the spindle K, secured at its rear end to the reach L, connected with the rear axle D and similar in construction to the one shown and described in the application for Letters Patent, Serial No. 410,796, for improvements in running gear, filed by me on November 2, 1891, and allowed March 25, 1892, so that further description thereof is not deemed necessary.

The spindle K between the lugs J' is engaged by a bearing N', supporting on its top a disk N, on which rests a fifth wheel O, secured to the under side of the front bolster P. Thus the latter is mounted to turn by its fifth wheel on the disk N and the latter is mounted to oscillate transversely by its connection with the spindle K, so that the front end of the wagon body is enabled to retain its position irrespective of the up and down motion or the turning motion of the front runners.

The rear bolster Q, is clipped to the rear axle D, as will be readily understood by reference to Fig. 4, the said rear bolster supporting in connection with the front bolster P the usual box or body (not shown) of the vehicle. The fifth wheel O is provided with downwardly and inwardly extending lugs O', engaging the under side of the disk N so as to prevent the bolster from becoming accidentally disconnected from the disk N. On the spindle K are journaled the ends of a U-shaped frame R, extending downwardly and having its middle portion mounted to turn on a pin S, projecting from the under side of the front axle C, the said pin S being in line with the axis of the fifth wheel J.

On the sides of the U-shaped frame R are secured inwardly-projecting lugs R', engaging the under side of the disk I and also the under side of the lugs J' of the fifth wheel J, see Fig. 2, so that the fifth wheel does not become accidentally disconnected from its disk I.

It will be seen that a bob-sled constructed in this manner can be readily guided in any direction, as the front axle is free to swing to the right or left, without disturbing the position of the wagon bed or body, owing to the fifth wheel connection on the front axle. Furthermore the box or bed of the vehicle is not affected if either of the front runners passes over higher or lower ground, as the box or bed will remain perfectly horizontal, owing to the pivotal connection of the front bolster with the fifth wheel J. As the runners are all mounted to swing they readily pass over obstructions in the roadbed, without danger of straining or breaking any part of the running gear.

Having thus fully described my invention, I claim as new and desire to secure by Letters Patent—

1. In a bob sled, the combination with the front axle, and a fifth wheel carried thereby, of a bolster and a universal joint connection between the bolster and fifth wheel, substantially as described.

2. In a bob sled, the combination with the front axle and a fifth wheel carried thereby, of a bearing pivoted to the fifth wheel, a bolster, and a fifth wheel secured to the bolster and turning upon said bearing, substantially as described.

3. A bob-sled, comprising front and rear axles, connected with each other, runners mounted to swing on the said axles, a fifth wheel held on the front axle, a bolster pivotally connected with the said fifth wheel, and a fifth wheel connection between the front bolster and its bearing, substantially as shown and described.

4. In a bob-sled, the combination with a front axle, and runners mounted to swing thereon, of a fifth wheel mounted to turn on a disk secured on the said front axle, a bearing pivotally connected with the said fifth wheel, a front bolster supported on the said bearing, a fifth wheel secured on the said bolster, and a disk, held on the said bearing and engaged by the said fifth wheel, substantially as shown and described.

5. In a bob-sled, the combination with a front axle and runners mounted to swing thereon, of a fifth wheel connected with the said front axle, a spindle journaled on the said fifth wheel, a reach carrying the said spindle, a rear axle connected with the said reach, and rear runners mounted to swing on the said rear axle, and a rear bolster fixed on the said rear axle, and a front bolster mounted to swing on the said spindle, substantially as shown and described.

6. In a bob-sled, the combination with a front axle and runners mounted to swing thereon, of a fifth wheel connected with the said front axle, a spindle journaled on the said fifth wheel, a reach carrying the said spindle, a rear axle connected with the said reach, rear runners mounted to swing on the said rear axle, a rear bolster fixed on the said rear axle, a front bolster mounted to swing on the said spindle, and a fifth wheel connection on the said front bolster and its bearing on the spindle, substantially as shown and described.

7. In a bob sled, the combination with an axle provided with thimbles having lugs, of runners provided with bearings having recesses to receive the lugs of the said thimbles, substantially as and for the purpose set forth.

8. In a bob sled, the combination with the front axle having a pin projecting from its under side, the fifth wheel, and bolster pivoted to the fifth wheel by the spindle of the reach, of the U-shaped frame R suspended from the said spindle and having its middle portion mounted on the pin on the axle, said frame being provided with inwardly projecting lugs R', substantially as described.

JAMES W. TAYLOR.

Witnesses:
AMOS DOAN,
MATHEW T. ADAMS.